US006911168B2

(12) United States Patent
Dugat et al.

(10) Patent No.: US 6,911,168 B2
(45) Date of Patent: Jun. 28, 2005

(54) METHOD AND DEVICE FOR PRODUCING A STRAIGHT CYLINDRICAL BODY BY MOLDING USING A LOOSE HARDENABLE GRANULAR MATERIAL AND THE UTILIZATION THEREOF FOR PRODUCING A TUBE

(75) Inventors: Jérôme Dugat, Montigny-le-Bretonneux (FR); Alain Louge, Rameldange (LU); Philippe Hatton, Arnouville-les-Gonesse (FR); Yves Van De Caveye, Beauvais (FR)

(73) Assignees: Bouygues Travaux Publics, Guyancourt (FR); Eurobeton S.A. (LU); S.A. Adler, Crevecoeur-le-Grand (FR)

( * ) Notice: Subject to any disclaimer, the term of this patent is extended or adjusted under 35 U.S.C. 154(b) by 0 days.

(21) Appl. No.: 10/181,194

(22) PCT Filed: Jan. 11, 2001

(86) PCT No.: PCT/FR01/00080

§ 371 (c)(1), (2), (4) Date: Oct. 24, 2003

(87) PCT Pub. No.: WO01/51264

PCT Pub. Date: Jul. 19, 2001

(65) Prior Publication Data

US 2004/0075185 A1 Apr. 22, 2004

(30) Foreign Application Priority Data

Jan. 12, 2000 (FR) ........................................... 00 00336

(51) Int. Cl.[7] .......................... B29C 59/00; B28B 3/00; A01J 21/00; A01J 25/12

(52) U.S. Cl. ...................... 264/102; 264/113; 264/120; 264/122; 264/333; 425/406

(58) Field of Search ................................ 264/109–128, 264/102, 333; 425/406

(56) References Cited

U.S. PATENT DOCUMENTS 5,885,496 A * 3/1999 Beane et al. ................ 264/101
6,596,224 B1 * 7/2003 Sachs et al. ................... 419/6

* cited by examiner

*Primary Examiner*—Stephen J. Lechert, Jr.
(74) *Attorney, Agent, or Firm*—Blakely Sokoloff Taylor & Zafman

(57) ABSTRACT

The invention relates to molding a right cylindrical body from a settable loose granular composition in a mold cavity, in which a mold cavity (4) is fed with successive charges of the composition in the loose state and each new charge is thrust by means of thrust surfaces (11) into the surface S of the molded composition in order to cause the new charge and the molded composition to interpenetrate in such a manner as to densify the molded composition. The invention is applicable to making a pipe, in particular out of a cement composition.

27 Claims, 5 Drawing Sheets

METHOD AND DEVICE FOR PRODUCING A STRAIGHT CYLINDRICAL BODY BY MOLDING USING A LOOSE HARDENABLE GRANULAR MATERIAL AND THE UTILIZATION THEREOF FOR PRODUCING A TUBE

This is a non-provisional application claiming the benefit of International application No. PCT/FR01/00080 filed Jan. 11, 2001.

The invention relates to molding a right cylindrical body using a settable granular composition.

The term "right cylinder" is used to designate the shape generated by a straight line referred to as a "generator" line which is moved parallel to itself around a curve known as a "director" curve situated in a plane perpendicular to the straight line. In the simplest case, the director curve is circular, however the invention is not limited to that particular profile and it extends to a director curve of any shape.

The body thus presents a right section that is constant in a plane perpendicular to the length direction of the body.

The invention applies in particular to molding a pipe using a settable cement or ceramic composition, but without being limited to that particular application.

Over the last few years, settable cement compositions have been developed that are constituted by relatively fine materials and that present a ratio of water over cement that is very low, in particular a weight ratio of less than 0.16.

Such compositions present mechanical characteristics that are highly advantageous.

Publication U.S. Pat. No. 5,545,297 describes the manufacture of a right cylindrical pipe from a cement composition in which the composition in the semi-solid state is caused to pass into the mold cavity of an extruder, with the extrusion pressure increasing with decreasing content of water relative to cement in the composition.

Publication EP 0 406 612 describes a technique for making a right cylindrical pipe in which a granular cement composition in the loose state is poured progressively into a vertical mold cavity having the shape of the pipe that is to be obtained, and in which the cavity is subjected to the action of a vibrating wall that generates radial forces and vertical forces that are directed upwards.

An object of the present invention is to provide an industrial technique for molding a right cylindrical body, in particular a pipe, using a granular composition that is initially loose, but without requiring high pressures to be implemented and without requiring such a vibrating wall to be implemented, while nevertheless being suitable for molding a settable cement composition that contains only a very small amount of water.

According to the invention, a right cylindrical mold cavity is used having a right section of dimensions corresponding to the right section of the body to be made, and said cavity is fed at a controlled rate with successive charges of the composition in the loose state, such that at all times the composition in place in the cavity presents a free surface, and each new charge is deposited on a zone of said free surface, and each new charge is thrust into said surface so as to cause the new charge to interpenetrate with the composition underlying said surface, thrust being applied by thrust means which are moved firstly with reciprocating motion directed towards and away from said free surface, and secondly with cyclical motion such that the thrust surfaces are moved over the entire free surface, and simultaneously with molding, relative displacement is implemented between the molded composition and the thrust surfaces so as to maintain a substantially constant distance between said free surface and the mean point of the stroke of the reciprocating motion of the thrust surfaces, said charges being delivered at a rate which is controlled in such a manner that during each cycle the material onto which the charges are deposited is progressively densified in depth by the cumulative interpenetration of the charges, conditions being adjusted in such a manner that over all of the cycles densification is substantially uniform throughout the material, and the molded composition is allowed to set.

Advantageously, the interpenetration is performed in such a manner that on each individual stroke of a thrust surface, the underlying composition is caused to interpenetrate over a depth that is not less than five times the mean diameter of the grain size of the coarsest ingredient of the composition.

If the composition contains fibers or other similar reinforcement, the dimensions of those ingredients are not taken into account when determining the depth of penetration.

In a preferred implementation, the maximum penetration depth is limited to ten times said mean diameter.

Thus, with a cement composition containing grains of sand which constitute the coarsest ingredient of the composition, conditions are preferably adjusted so that the interpenetration takes place over a depth of five times to ten times the mean diameter of the grains of sand, i.e., for example, to a depth lying in the range 1.5 millimeters (mm) to 3 mm, if said mean diameter is 0.3 mm.

Preferably, charges of loose material are placed simultaneously on a plurality of non-touching zones of said free surface.

Although the method is preferably implemented continuously, i.e. by delivering charges in continuous manner, it is also possible to operate discontinuously. In particular circumstances:

in order to apply thrust to the charges, a plurality of separate thrust surfaces are used;

the charges are introduced between the thrust surfaces;

said cyclical motion is rotary motion;

said relative displacement is performed by delivering the molded composition through the mold cavity as in a die, as molding progresses;

said relative displacement is performed by moving the thrust surfaces as the depth of the molded composition increases in the mold cavity;

said relative displacement is implemented by moving simultaneously both the wall of the mold cavity and the thrust surfaces;

a pressure lower than atmospheric pressure is implemented for degassing the charges prior to applying thrust thereto; and a phase offset is implemented between the reciprocating motions of the various thrust surfaces.

The material is allowed to set prior to unmolding or after unmolding as appropriate.

When the invention is applied to making a body from a cement composition, it is preferable to use a composition made up of fine powders, for example a composition such as the concrete matrix composition defined in publication FR 2 707 625.

In order to implement the method of the invention, it is recommended according to the invention to implement apparatus comprising:

a mold which determines a right cylindrical mold cavity presenting a right section of shape identical to that of the body to be made and which extends along an axis perpendicular to the plane of said right section over a length equal to a fraction or all of the length of the body to be made;

introduction means for introducing a controlled flow of charges for the loose composition towards said cavity;

thrust means defining a plurality of separate thrust surfaces distributed around said axis and directed towards the plane of the right section of the mold cavity;

control means for causing the thrust surfaces to move firstly with reciprocating motion directed along said axis and secondly with cyclical motion about said axis; and control means operative during molding to impart relative displacement between the molded composition and the thrust surfaces as a function of the rate at which the loose material is introduced, so as to keep substantially constant the distance between the free surface of the molded composition and the mean point of the stroke of the reciprocating motion.

In preferred embodiments:

the introduction means are designed to introduce the charges between the thrust surfaces;

the mold cavity constitutes a die through which the molded material is thrust;

the mold cavity is defined by a gap between two walls, one of said walls being displaceable together with the thrust surfaces in order to achieve said relative displacement.

the mold is stationary and the thrust surfaces are displaceable to implement said relative displacement;

the thrust surfaces are such as to leave a lateral gap between themselves and the walls which define the mold cavity, said gap enabling a portion of the material of the charges to be disengaged under the effect of the displacements of the thrust surfaces; and the thrust surfaces are preceded in the direction of said cylindrical motion by sloping surfaces under which the charges are precompacted.

The reciprocating motion and the cyclical motion of the thrust surfaces are obtained by selecting any conventional means (motor driven gearing, cams, return springs, crank and connecting rod systems, etc.) which are well known to mechanical engineers and do not require description herein.

There follows a description of embodiments of apparatus in accordance with the invention applied to making a pipe, given with reference to the figures of the accompanying drawings, in which.

Figure 1:
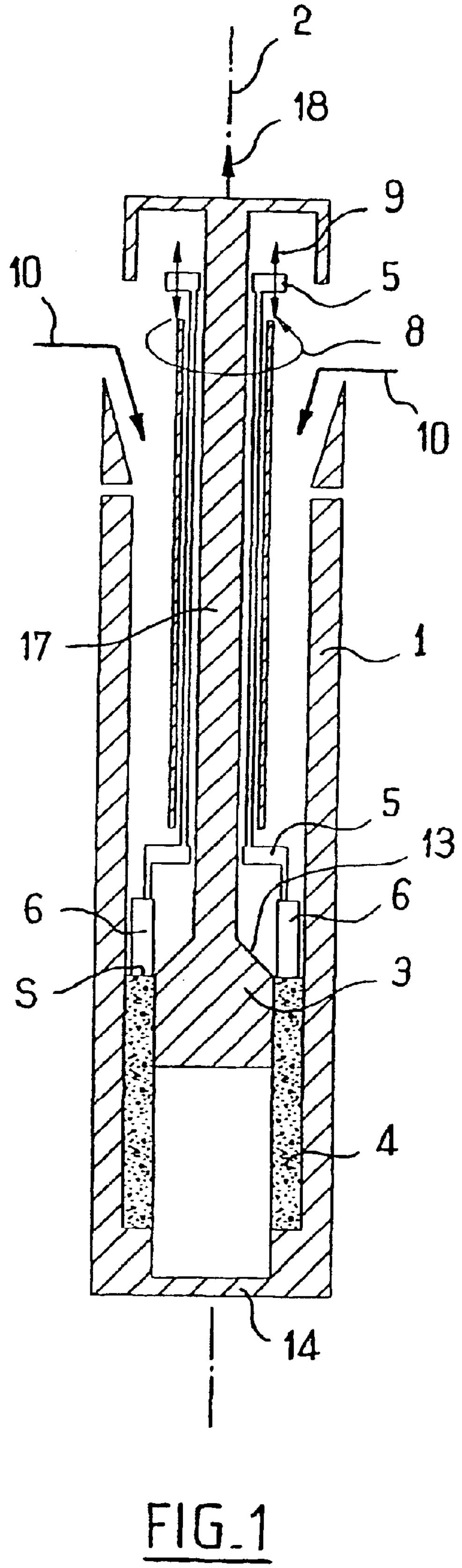
FIG. 1 is a diagrammatic axial section through apparatus in accordance with the invention and showing only the essential portions thereof.

The mold shown in FIG. 1 for use in making a right cylindrical pipe of circular right section is essentially constituted by two coaxial cylindrical walls (1), (3) about a vertical axis (2), defining between them an annular mold cavity (4) of transverse dimensions that correspond to the transverse dimensions of the pipe to be made.

A rotor (5) is disposed in said cavity and carries a plurality of mutually identical thrust tools (6) that are spaced apart at constant intervals.

Respective means (not shown) are used for driving the tool respectively in cyclical motion about the axis (2) of the mold cavity, in the direction of arrow (8), and in reciprocating motion along arrow (9) parallel to the axis (2) of the mold cavity.

Means represented by arrows (10) are present for introducing charges of loose material between the tools. To guide the charges to the surface (S) of the material that has already been molded, a frustoconical wall (13) is provided above the inside wall of the mold (3).

Figure 2:
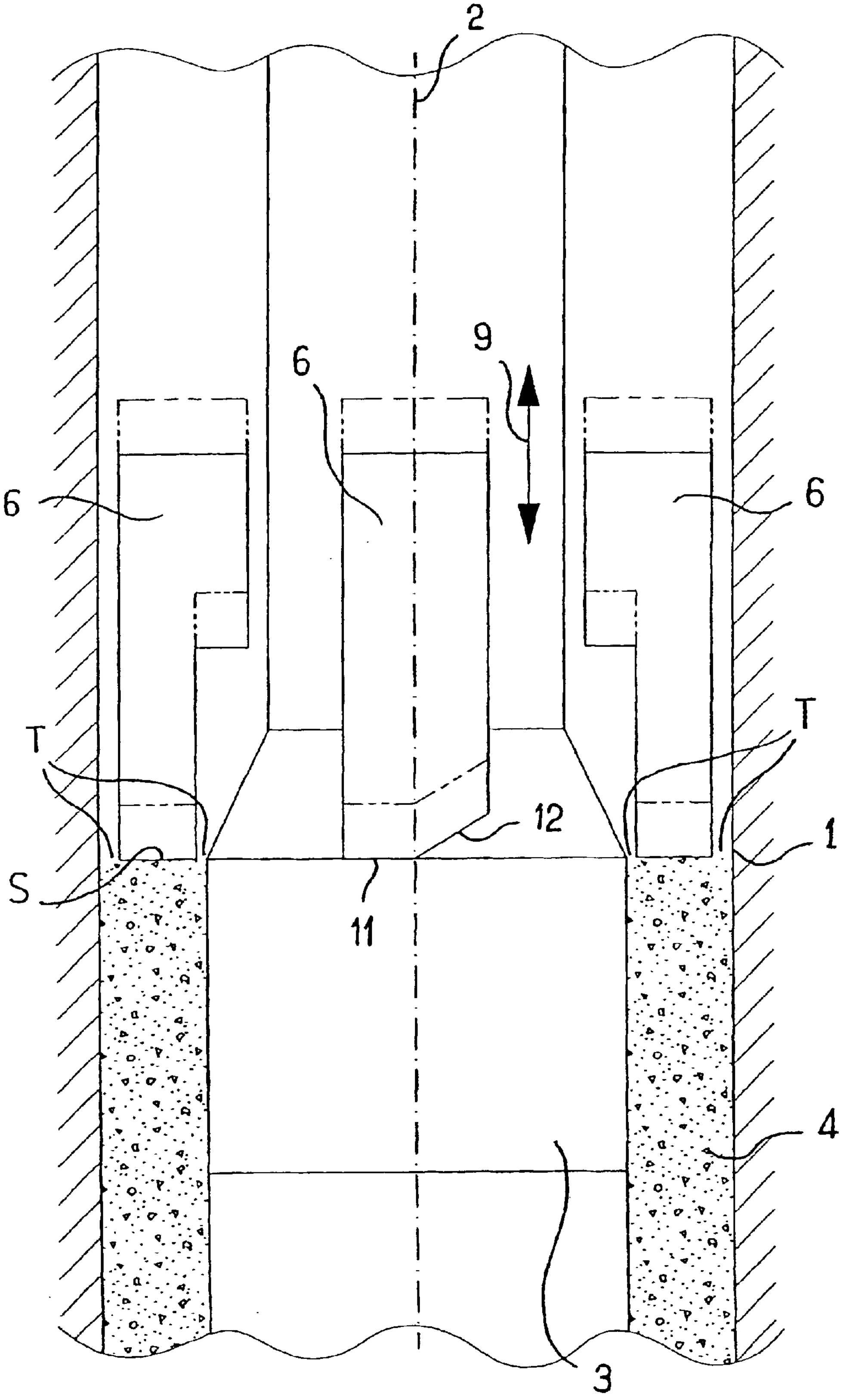
FIG. 2 is a diagram showing details of the FIG. 1 apparatus in axial section.
Figure 3:
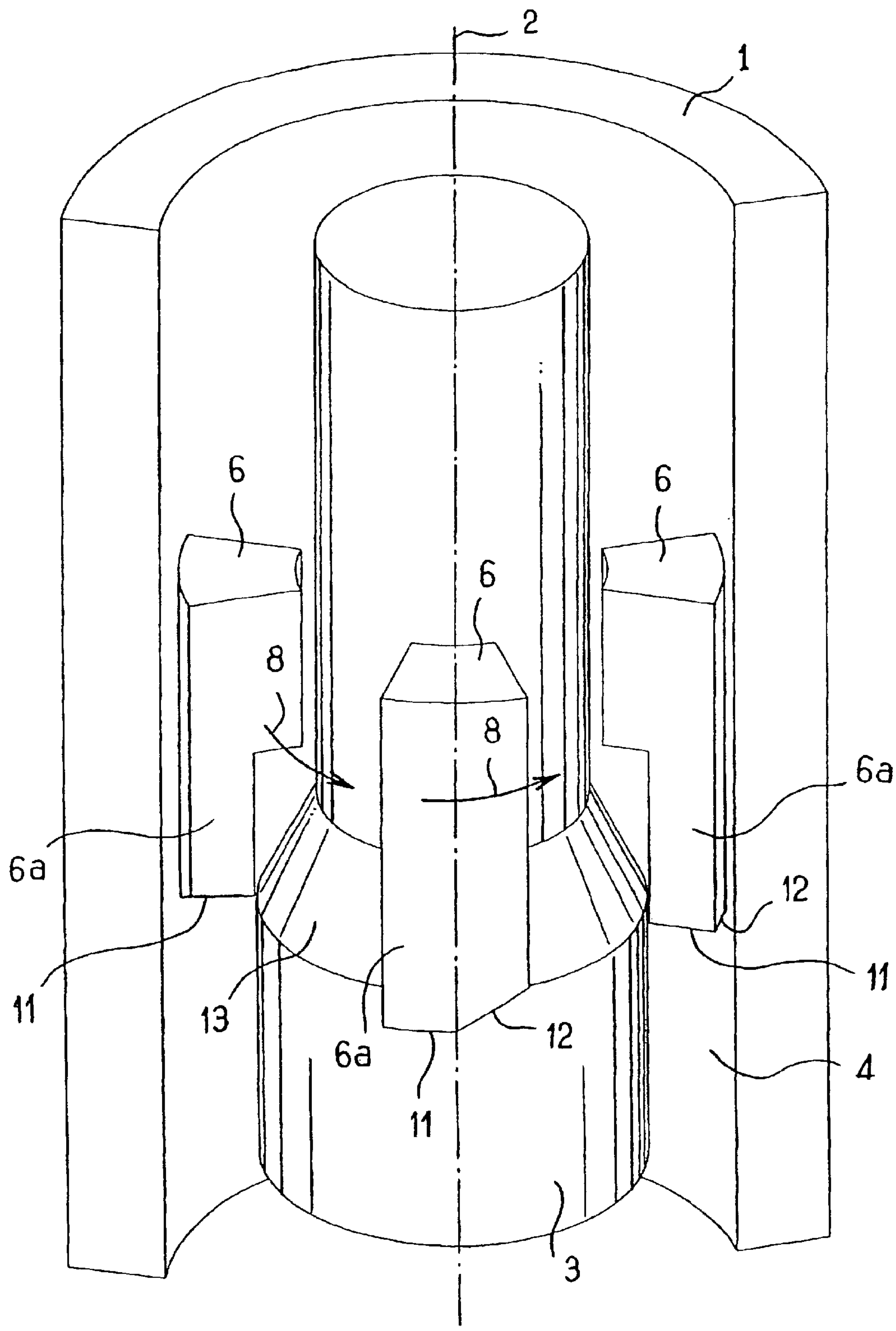
FIGS. 3 and 4 are diagrammatic perspective views showing the FIG. 2 apparatus respectively as seen from the eye of an observer looking obliquely downwards at 45° (FIG. 3) and looking obliquely upwards at 45° (FIG. 4)
Figure 4:
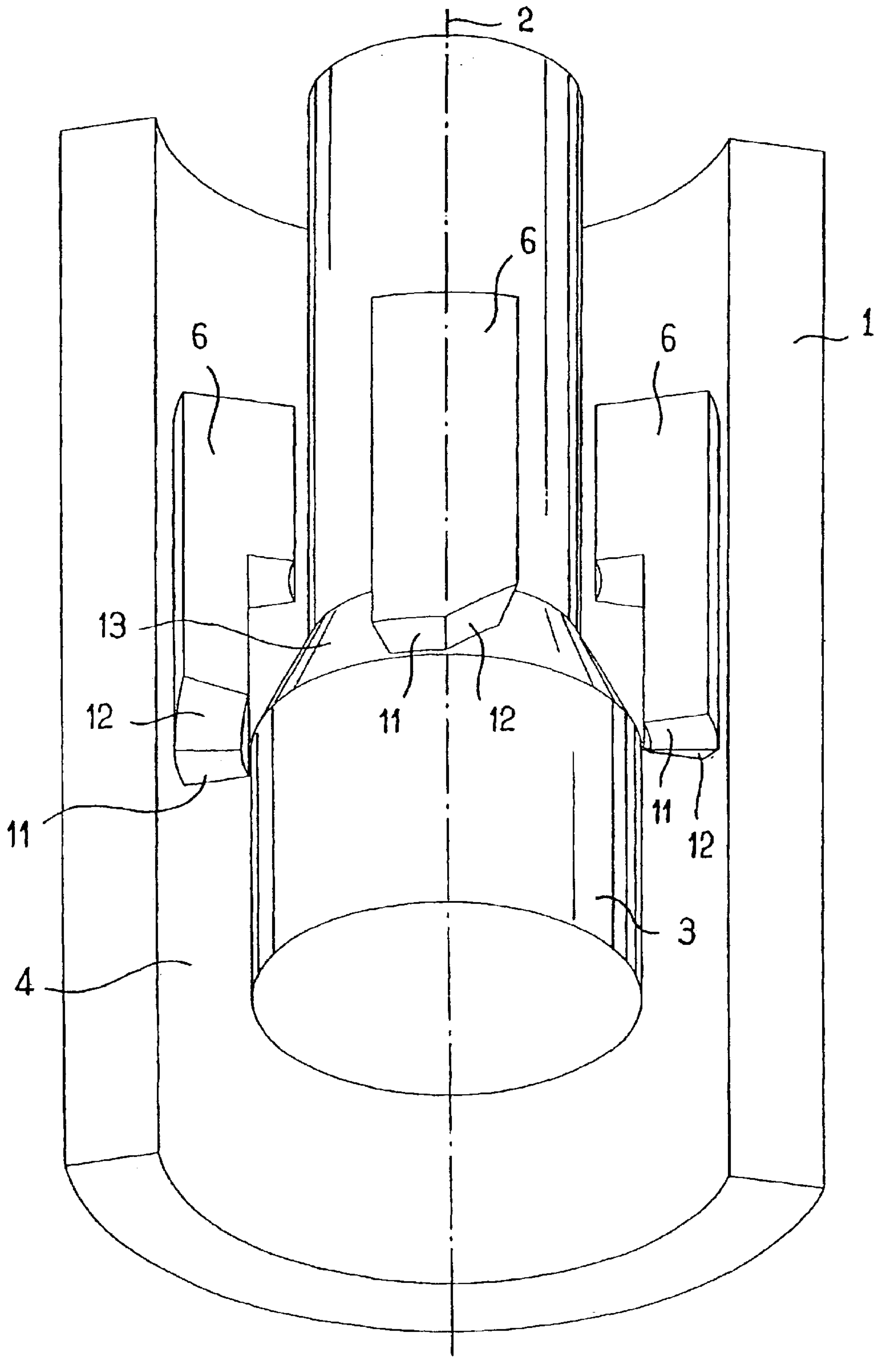

FIGS. 2 to 4 show portions of the FIG. 1 apparatus on a different scale so as to show the tools more clearly while omitting their common support.

The tools are shaped so that each presents a bottom end **(6*a*) with a face (11) facing downwards to thrust the loose material towards the free surface of the material that is already in place in the mold when the tool is moved downwards, and a face (12) facing in the direction of rotation as indicated by arrow (8)**, preceding the thrust face in the rotary motion of the tool, and suitable for precompacting the charge of loose material.

These two faces contribute to thrusting the material of the charges into the molded material. Together these faces preferably constitute a convex surface. They are themselves either plane or bulging.

FIG. 2 shows the tools in their extreme positions during their reciprocating motion; in their low position (continuous lines) and in their high position (dashed lines).

In practice, the reciprocating motion of the thrust surfaces is preferably adjusted to operate at a frequency that is quite high, typically 5 to 50 go-and-return strokes per second, and better still 10 to 30 go-and-return strokes per second.

Between the tools and the walls of the mold cavity there preferably exists a lateral gap (T).

Figure 5:
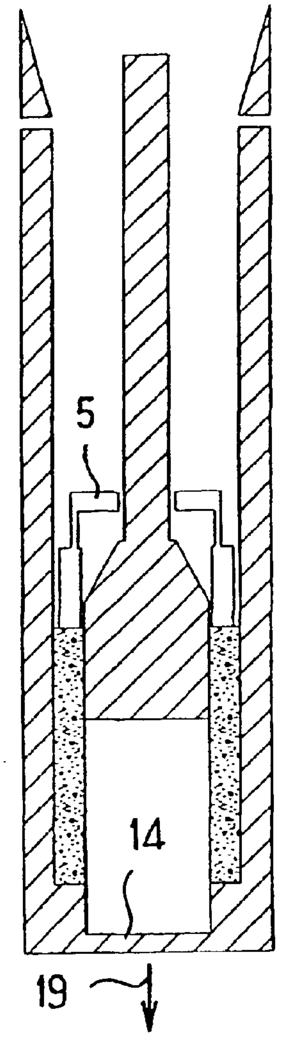
FIGS. 5 to 7 are diagrams of apparatuses constituting different embodiments of the invention.
Figure 6:
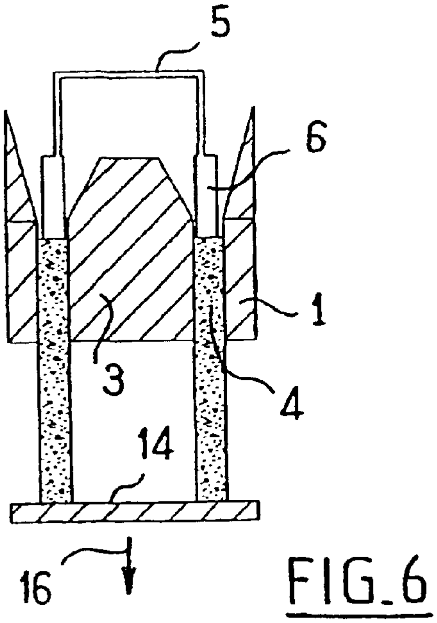
Figure 7:
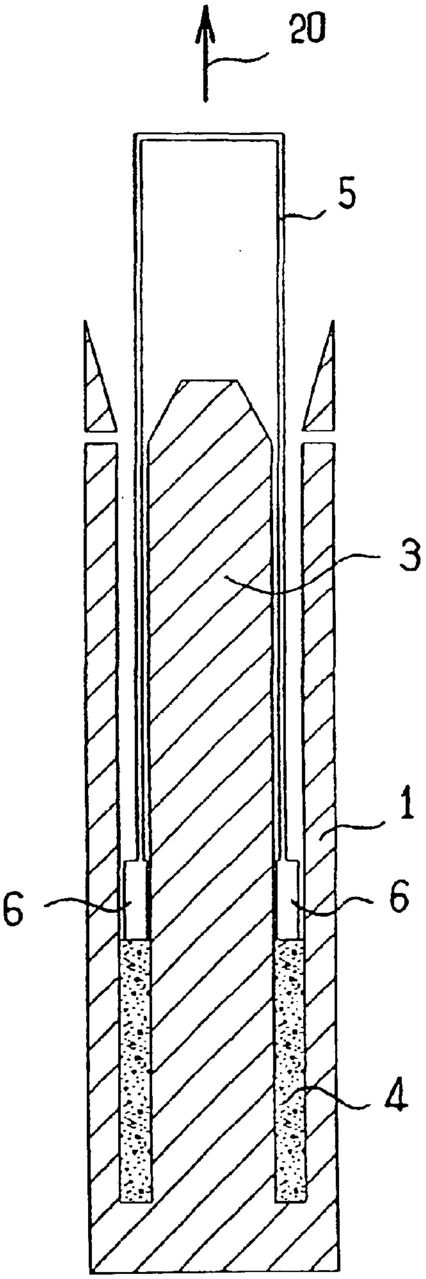

The figures show various ways of driving the tools so as to implement relative displacements between the molded material and the tools as the amount of molded material increases:

in FIG. 1, the outer wall (1) of the mold is stationary and its inner wall (3) is displaced upwards during molding together with the tools. For example, the mold has a core (17) whose bottom portion is shaped to constitute the wall (3) of the mold, said core carrying the tools (6) so that they can turn about the core (arrow 8) and move up or down (arrow 9); the core itself is displaced upwards (arrow 18) during molding;

in FIG. 5, the mold is displaced progressively away from the tools during molding in the direction of arrow (19), the tools remaining in the same place (naturally ignoring their two functional motions, reciprocating motion and rotation);

in FIG. 6, the mold acts as a die and its end wall (14) is displaced (arrow 16) during molding so as to maintain a substantially constant distance between the free surface (S) of the molded material and the mean point of the reciprocating stroke of the tools; and in FIG. 7, the mold is stationary and the tools are driven progressively upwards during molding (arrow 20).

EXAMPLE

To make a tube of cement material, the following operations are performed:

a material is prepared which is loose, dry, and powdery, being constituted essentially by mixing the following ingredients (for 10 kilograms (kg) of material):

4.5 kg of sand in which the grain size is about 0.3 mm;

0.9 kg of ground quartz having a grain size of 10 micrometers ($\mu$m);

1 kg of silica soot (particle size 0.5 $\mu$m);

3.1 kg of Portland cement (mean size 15 $\mu$m);

0.1 kg of a superplasticizer (at 30% dry extract); and 0.4 kg water.

The specific gravity of the loose material lies in the range 1 to 1.5;

a vertical mold is constructed with two coaxial cylindrical walls having respective diameters of 120 mm and 100 mm, together with an end wall, and the central wall of the mold is used to carry the four thrust tools shaped in accordance with the invention;

a fraction of the loose material is poured into the bottom of the mold so as to constitute a ring having a depth of a few millimeters; and each thrust tool is driven to perform reciprocating vertical motion at 15 strokes per second over a vertical distance of 10 mm, with the reciprocating motion of the various tools being phase-offset by one-fourth of a cycle, and the tools also performing rotary motion at one revolution per second, while the free surface is fed with loose material at a volume rate of 0.2 liters per second and while the tools and the central wall of the mold are subjected to vertical displacement at a speed of 3 centimeters per second (cm/s).

Thus, for each revolution a layer is obtained having a thickness of 3 cm and specific gravity of about 2.5.

The material is allowed to set in the mold, and it is unmolded.

The invention is not limited to this example nor to the embodiments that have been described.

What is claimed is:

1. A method of manufacturing a right cylindrical body by molding a settable loose granular composition in a mold cavity, in which method a right cylindrical mold cavity is used having dimensions in right section equal to the right section of the body to be made, and said cavity is fed with a controlled rate of flow of successive charges of the composition in the loose state, in which said feeding is performed in such a manner that at all times the composition in place in the cavity presents a free surface and each new charge is deposited on a zone of said free surface, and each new charge is thrust into said surface by means of thrust surfaces that are moved both in reciprocating motion directed towards and away from said free surface, and in cyclical motion such that the thrust surfaces are moved over the extent of the free surface, and simultaneously during molding, relative displacement is implemented between the molded composition and the thrust surfaces, the method being characterized in that each new charge is thrust in such a manner that on each individual stroke of a thrust surface, the underlying composition is caused to interpenetrate over a depth that is not less than five times the mean diameter of the grain size of the coarsest ingredients of the composition, in that said relative displacement is performed in such a manner as to maintain a substantially constant distance between said free surface and the mean point of the stroke of the reciprocating motion of the thrust surfaces, and in that the flow rate of said charges is controlled in such a manner that during each cycle the material onto which the charges are deposited becomes progressively densified in depth by the cumulative interpenetration of the charges, conditions being adjusted in such a manner that over all of the cycles, this densification is substantially uniform throughout the material, and the molded composition is allowed to set.

2. A method according to claim 1, in which the maximum penetration depth obtained on each individual stroke of a thrust surface is limited to ten times the mean diameter of the grain size of the coarsest ingredients of the composition.

3. A method according to claim 1 or claim 2, in which charges of loose material are deposited simultaneously on a plurality of non-touching zones of said free surface.

4. A method according to claim 1, in which the charges are delivered continuously.

5. A method according to claim 1, in which a plurality of separate thrust surfaces are used.

6. A method according to claim 5, in which the charges are introduced between the thrust surfaces.

7. A method according to claim 1, in which said relative displacement is performed by delivering the molded composition through the mold cavity as in a die, as molding progresses.

8. A method according to claim 1, in which said relative displacement is performed by moving the thrust surfaces as the depth of the molded composition increases in the mold cavity.

9. A method according to claim 1, in which said relative displacement is implemented by moving simultaneously the wall of the mold cavity and the thrust surfaces.

10. A method according to claim 1, in which a pressure lower than atmospheric pressure is implemented for degassing the charges prior to applying thrust thereto.

11. A method according to claim 1, in which a phase offset is implemented between the reciprocating motions of the various thrust surfaces.

12. A method according to claim 1, in which the reciprocating motion of the thrust surfaces is implemented at a frequency of 5 to 50 go-and-return strokes per second.

13. A method according to claim 12, in which said frequency is set to lie in the range 10 to 30 go-and-return strokes per second.

14. A method according to claim 1, in which said cyclical motion of the thrust surfaces is rotary motion.

15. Apparatus for implementing a method according to claim 1, the apparatus comprising a mold (1, 3) defining a right cylindrical mold cavity (4) of right section that is identical in shape to the right section of the body to be made and that extends along an axis (2) perpendicular to the plane of said right section over a length that is equal to a fraction or the entire length of the body to be made; introduction means (10) for introducing a controlled flow of charges of the loose composition into said cavity; thrust means (6) defining a plurality of separate thrust surfaces (11) distributed around said axis and directed towards the plane of the right section of the mold cavity, and such as to ensure that there exists a lateral gap between said surfaces and the walls defining the mold cavity, said gap serving to disengage a fraction of the material of the charges under the effect of the displacements of the thrust surfaces; control means for moving the thrust surfaces both with reciprocating motion (9) directed along said axis, and with cyclical motion (8) about said axis, and control means operative during molding to implement relative displacement (18; 19; 16; 20) between the molded composition and the thrust surfaces as a function of the rate at which the loose material is introduced so as to maintain a substantially constant distance between the free surface of the molded composition and the mean point of the stroke of the reciprocating motion.

16. Apparatus according to claim 15, in which the introduction means (10) are designed to introduce the charges between the thrust surfaces.

17. Apparatus according to claim 15 or claim 16, in which the mold cavity (4) constitutes a die.

18. Apparatus according to claim 15 or claim 16, in which the mold cavity (4) is defined by a gap between two walls (1, 3), one of said walls being displaceable together with the thrust surfaces in order to achieve said relative displacement.

19. Apparatus according to claim 15 or claim 16, in which the mold is stationary and the thrust surfaces (11) are displaceable to implement said relative displacement.

20. Apparatus according to claim 15, in which the thrust surfaces (11) are preceded in the direction of said cylindrical motion by sloping surfaces (12) for precompacting the charges.

21. Apparatus according to claim 20, in which the thrust surface (11) and the precompacting sloping surface (12) together form a bulging surface.

22. Apparatus according to claim 15, in which the mold has a frustoconical wall (13) for guiding the charges towards said free surface.

23. A method according to claim 1, in which said composition is a cement composition.

24. A method according to claim 23, in which the cement composition contains grains of sand constituting the coarsest grain size of the ingredients of the composition.

25. A method according to claim 23 or claim 24, in which the cement composition contains water at a water/cement weight ratio of not more than 0.16.

26. A method according to claim 23, in which said body is a pipe.

27. A method according to claim 1, in which said body is a pipe.

* * * * *